Sept. 28, 1965  J. S. MAGIERA  3,208,153
DRAFTING INSTRUMENT

Filed July 30, 1962  2 Sheets-Sheet 1

INVENTOR.
JOSEPH S. MAGIERA
BY *Hobbs & Caxton*
ATTORNEYS

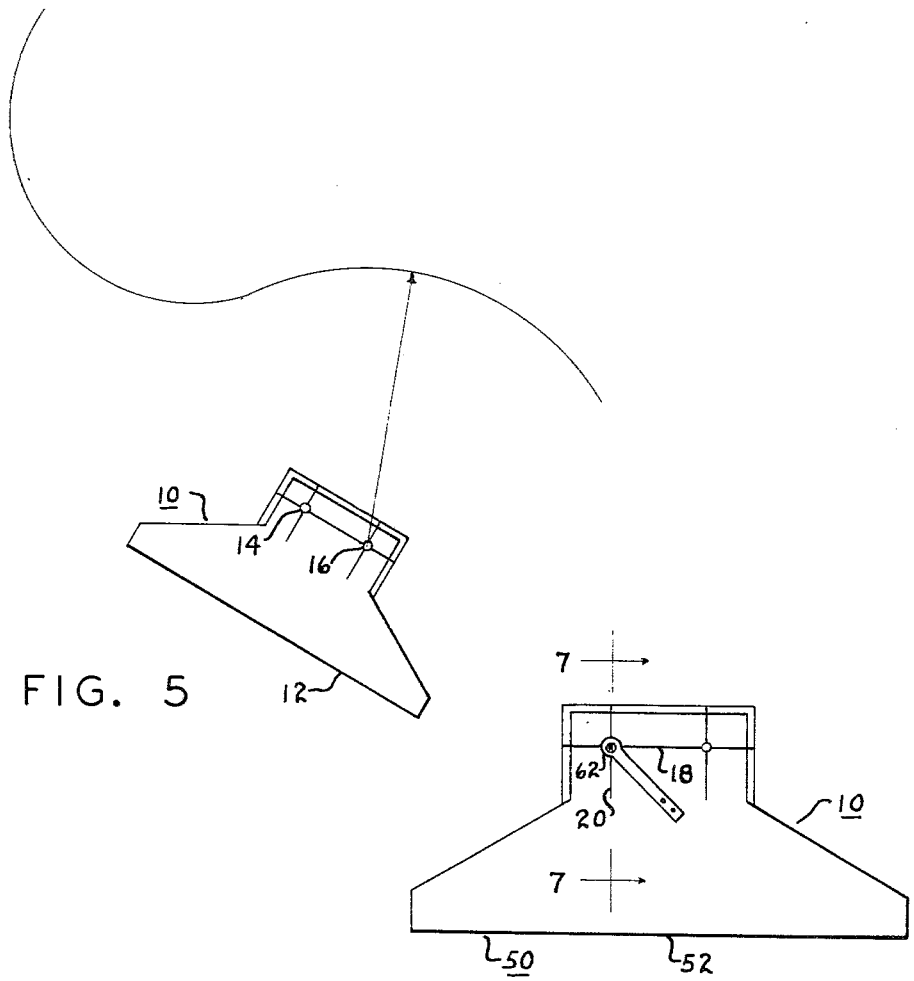
FIG. 5
FIG. 6
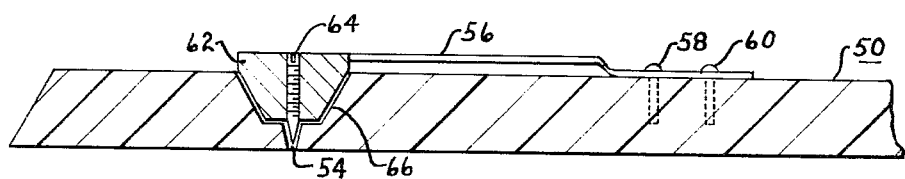
FIG. 7

United States Patent Office 3,208,153
Patented Sept. 28, 1965

3,208,153
DRAFTING INSTRUMENT
Joseph S. Magiera, 446 S. Falcon St., South Bend, Ind.
Filed July 30, 1962, Ser. No. 213,430
2 Claims. (Cl. 33—189)

The present invention relates to a drafting instrument and more particularly to a center locating guide or instrument.

The centers of circles and arcs on drawings are usually merely indicated by two right angle intersecting lines with the center being at the point of intersection of the two lines. In drawing the circle or arc, the draftsman places the point of his compass at the point of intersection, perforates the drawing paper with the compass, and then proceeds to draw the circle or arc. Finding the exact and true point of intersection of the two lines by the normal visual process is often difficult, and the compass point is frequently incorrectly positioned slightly to one side or the other of the true point. It is therefore one of the principal objects of the present invention to provide a center locating instrument which gives a high degree of accuracy in locating the center point indicated on the drawing by merely two intersecting lines, and which can be readily used to obtain the true center without any high degree of care, practice or skill.

Another object of the invention is to provide a relatively simple, inexpensive and versatile drafting instrument for locating the center points of circles and arcs, which locates the point and provides a guide for positioning a pointer or other instrument for puncturing the drawing sheet for the compass point, or provides a special recess for the compass point to prevent perforation of the drawing sheet.

Still another object of the invention is to provide a drafting instrument for accomplishing the aforementioned operations which is easily handled and manipulated to perform those operations, and which can be readily used with the conventional drafting and drawing board equipment.

A further object is to provide an instrument having a seat for the point of a compass which serves as a roving center adapted to assist in locating the center point of an arc without perforating, scoring or otherwise damaging the drawing sheet, and which can be effectively used to retain the compass point in proper position while the arc is being drawn.

Another object of the invention is to provide an instrument of the aforesaid type which can easily be fabricated from standard materials using conventional equipment, and which is convenient and fast to use and results in improved neatness in the drawing.

Additional objects and advantages of the present invention will become apparent from the following description and accompanying drawings, wherein:

FIGURE 5 is a top plan view of the present drafting instrument, illustrating the manner in which one of the features of the present invention is used;

FIGURE 6 is a top plan view of a modified form of the present drafting instrument; and FIGURE 7 is an enlarged fragmentary cross sectional view of the drafting instrument shown in FIGURE 6, the section being taken on line 7—7 of the latter figure.

Figure 1:
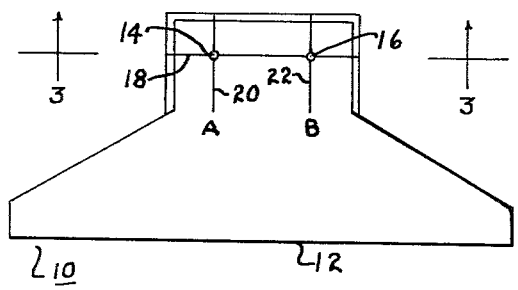
FIGURE 1 is a top plan view of the present drafting instrument.
Figure 2:
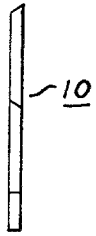
FIGURE 2 is a side elevational view of the drafting instrument shown in FIGURE 1.

Referring more specifically to the drawings, FIGURE 1 illustrates the present drafting instrument in full scale, wherein the instrument 10 consists of a transparent plastic body of the thickness illustrated in FIGURE 2. The instrument is provided with a straight edge 12 for engaging a T-square, triangle or other type of straight edge, and contains two compass points locating recesses 14 and 16. The two recesses may be placed at any convenient location in the body of the instrument, the construction or shape of the two recesses being clearly shown in the enlarged view of the instrument shown in FIGURE 3. The instrument is constructed of transparent material and contains three intersecting lines, line 18 extending through the two recesses, and lines 20 and 22 extending through recesses 14 and 16, respectively. The two lines 20 and 22 are at right angles to line 18, and the three lines are preferably small grooves containing a black pigment or other readily visible material. Line 20 is designated with the letter A and line 22 with the letter B in order to identify the two different type of recesses 14 and 16. The particular shape of the body of the present instrument is not important as long as a suitable straight edge 12 is provided along the base of the instrument and the holes spaced therefrom a distance sufficient to be easily used.

Figure 3:
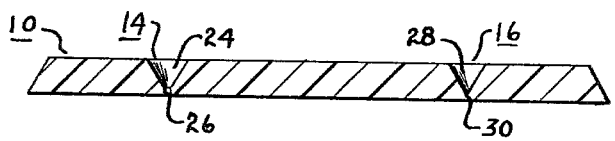
FIGURE 3 is an enlarged vertical cross sectional view of the drafting instrument shown in FIGURE 1, the section being taken on line 3—3 of the latter figure.

The shape of the two recesses 14 and 16 is clearly shown in FIGURE 3 wherein recess 14 consists of a conically-shaped, inwardly extending depression connected at its lower end to the lower side of the instrument by a small hole 26. Recess 16 consists of a conically-shaped depression 28 terminating at its lower end in a sharp point 30, the latter conically-shaped depression being closed at its lower end rather than being connected to the lower side as is depression 24. Hole 26 is adapted to receive a needle or compass point, and conical depression 24 is adapted to guide the needle or compass point conveniently to hole 26.

Figure 4:
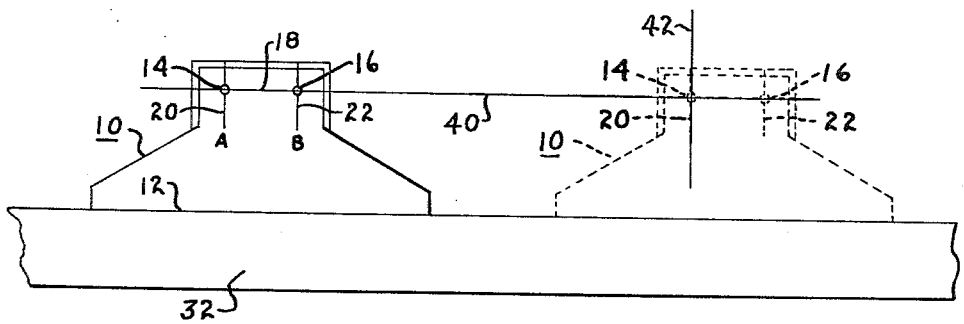
FIGURE 4 is a plan view of the present drafting instrument and a straight edge, illustrating the manner in which the present drafting instrument is used.

In the use of the foregoing instrument, the straight edge 12 thereof is placed against a suitable straight edge 32, as illustrated in FIGURE 4, and the instrument and straight edge are moved vertically up or down until horizontal center line 18 is above guide line 40 on the drawing sheet. After line 18 has been superposed on line 40, the straight edge is held firmly in place and the instrument is moved laterally toward guide line 42 until line 20 is superposed on line 42. When this position has been obtained, the hole 26 is directly above the intersection of lines 40 and 42, as illustrated in the right-hand figure of FIGURE 4. A needle or compass point is then inserted through hole 26, and the drawing sheet marked by a small perforation. The instrument is then removed from the immediate drawing area and the compass point placed in the perforation for drawing the desired circle or arc. The instrument may be used to mark a series of center points before the compass is used.

When recess 16 is to be used, the compass point is first adjusted to compensate for the thickness of the material remaining between point 30 and the bottom of the instrument, and the instrument is then slid vertically with the straight edge until line 18 is superposed on guide line 40, as illustrated in FIGURE 4. The instrument is then slid laterally until line 22 is superposed on guide line 42. The compass may then be placed in the recess and used with the instrument in that position for scribing an arc. In the event the center points were not provided on the drawing for an arc, recess 16 of the present instrument may be used for sliding the compass point to various locations in determining the correct center for the arc. One of the primary advantages in this latter operation is the effective use of the compass without perforating, scoring or otherwise damaging the drawing sheet.

In the embodiment of the present invention illustrated in FIGURES 6 and 7, the basic construction is substantially the same as the one previously described, the instrument 50 containing a straight edge 52 for engagement with the straight edge of a T-square, triangle or the like. A hole 54 is provided for locating the center point of a circle or arc, and in this embodiment, instead of using a separate needle or compass point, a special point is provided consisting of a resilient member 56, attached at one end to the upper side of the instrument by rivets or pins 58 and 60 and carrying at the other end a frusto-conically shaped head 62 through which an adjustable pin 64 extends and projects downwardly into hole 54. A frusto-conically shaped recess 66 is provided in the upper surface of the instrument and is substantially the same shape and size as head 62 so that it will assist in centering the pin in hole 54. The pin is threadedly received in head 62 and is adapted to be adjusted vertically so that as the head is depressed to recess 66, the pin will project a predetermined distance below the lower surface of the instrument for perforating the drawing sheet at the desired location. Member 56, including head 62, is preferably formed of suitable metal, and pin 64 is preferably formed of steel or other metal capable of maintaining a sharp point thereon. Member 56 is preferably positioned at a forty-five degree angle from lines 18 and 20, as illustrated in FIGURE 6, to prevent the member from interfering with the easy vision of lines 18 and 20.

When the instrument of the modified form shown in FIGURES 6 and 7 is to be used, it is placed along a suitable straight edge, such as a T-square, and, with the straight edge, is moved vertically to the position at which line 18 is superposed on line 40, and is then moved to the position in which line 20 is superposed on line 42. When the two lines are thus positioned with respect to guide lines 40 and 42, the draftsman places his finger on head 62 and presses it downwardly, thus causing pin 64 to project downwardly through hole 54 and perforate the drawing sheet at the desired compass point.

While only two embodiments of the present invention have been described in detail herein, various other modifications and changes may be made to satisfy requirements without departing from the scope of the invention.

I claim:
1. A drafting instrument for locating center points on drawing sheets, comprising a plate-like body of transparent material having a relatively long straight edge on one side for engagement with a straight edge on the drawing board and a relatively short edge on the opposite side, a frusto-conically shaped recess extending inwardly from the upper surface of said body, said recess being connected by a hole at its center with the lower surface, spaced indicators on said body, such that if connected by lines, said lines would intersect one another at right angles at said recess, a resilient member secured at one end to the upper surface of said body and having a frusto-conically shaped head at the other end of substantially the same size as said recess for seating therein, and a pin extending vertically through and threadedly received in said head and having a sharp point on its lower end projecting below said head.

2. A drafting instrument for locating center points on drawing sheets, comprising a plate-like body of transparent material having a relatively long straight edge on one side for engagement with a straight edge on the drawing board and a relatively short edge on the opposite side, a recess extending inwardly from the upper surface of said body, said recess being connected by a hole at its center with the lower surface, spaced indicators on said body such that if connected by lines said lines would intersect one another at right angles at said recess, a resilient member secured at one end to the upper surface of said body and having a head at the other end of substantially the same size and shape as said recess for seating therein, and a pin extending vertically through and threadedly received in said head and having a sharp point on its lower end projecting below said head.

References Cited by the Examiner
UNITED STATES PATENTS

| | | | |
|---|---|---|---|
| 392,143 | 10/88 | Wright | 33—27 |
| 452,054 | 5/91 | Sperry | 33—107 |
| 673,687 | 5/01 | Penfield | 33—27 |
| 777,770 | 12/04 | Barnes | 33—104 |
| 888,377 | 5/08 | Wood. | |
| 1,154,673 | 9/15 | Van Ness | 33—75 |
| 1,160,432 | 11/15 | Middleton | 33—107 |
| 1,529,293 | 3/25 | Beulwitz | 33—189 |
| 1,544,327 | 6/25 | Loewenthal | 33—104 X |
| 1,692,149 | 11/28 | Castan. | |
| 1,742,684 | 1/30 | Bowman | 33—104 X |
| 1,961,500 | 6/34 | Larson | 33—1 |

OTHER REFERENCES

American Machinist, Jan. 13, 1958, page 126.
Popular Mechanics, February 1962, page 182.

ISAAC LISANN, *Primary Examiner.*